Feb. 28, 1928.
T. BIRKENMAIER
COATING APPARATUS
Filed July 26, 1924
1,661,150
4 Sheets-Sheet 1
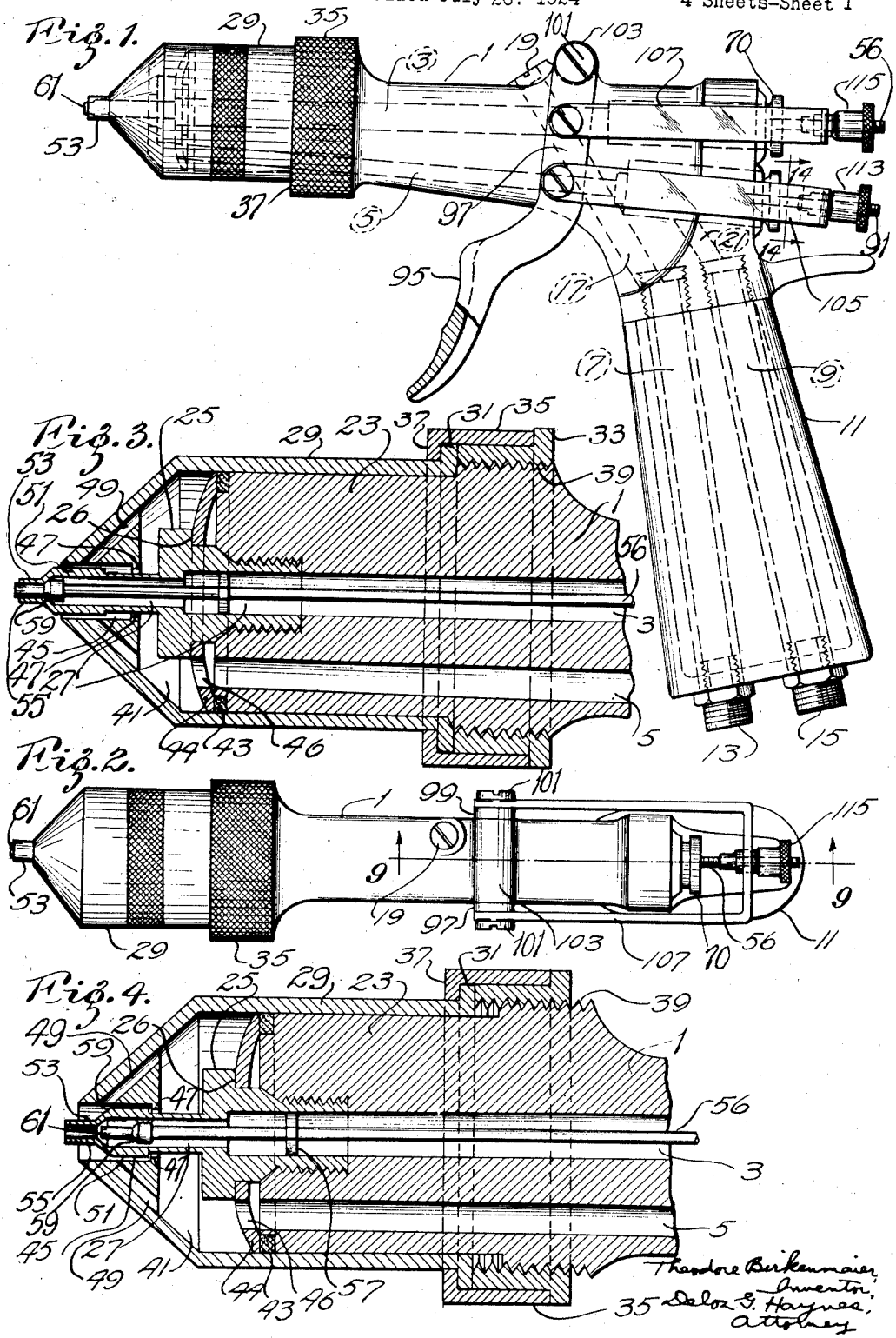

Feb. 28, 1928.
T. BIRKENMAIER
1,661,150
COATING APPARATUS
Filed July 26. 1924     4 Sheets-Sheet 2
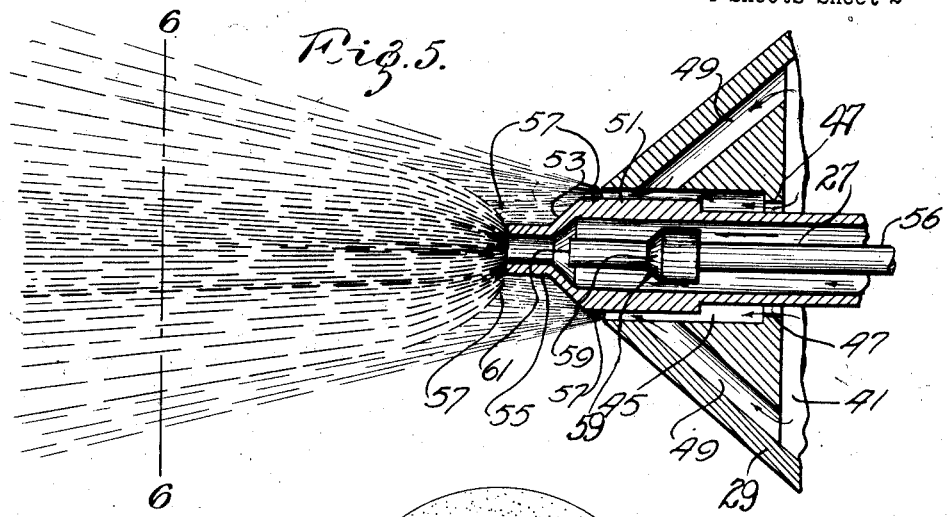
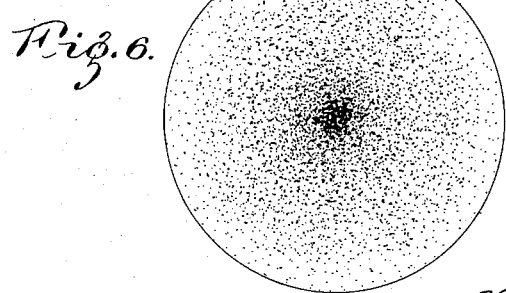
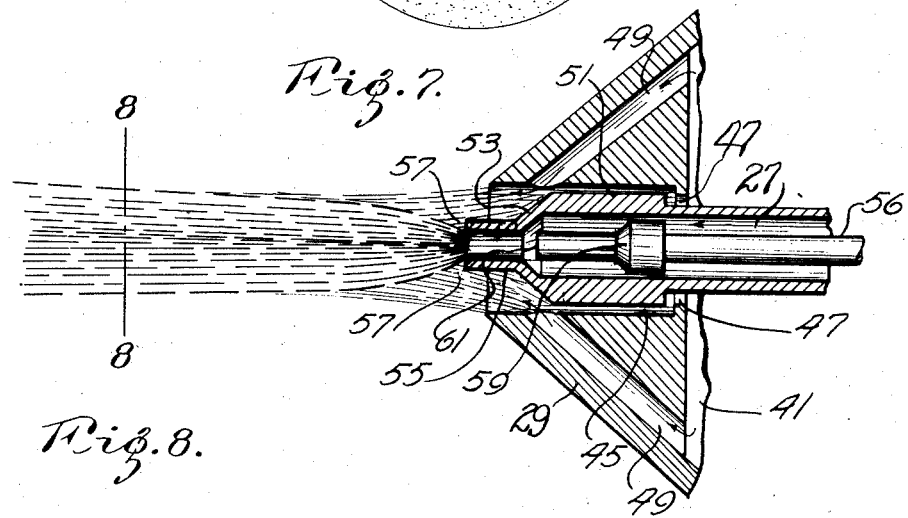
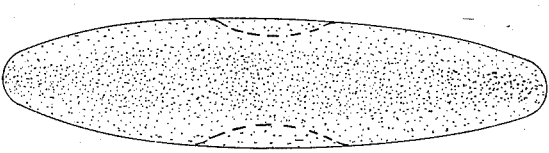
Theodore Birkenmaier,
Inventor,
Delos G. Haynes,
Attorney

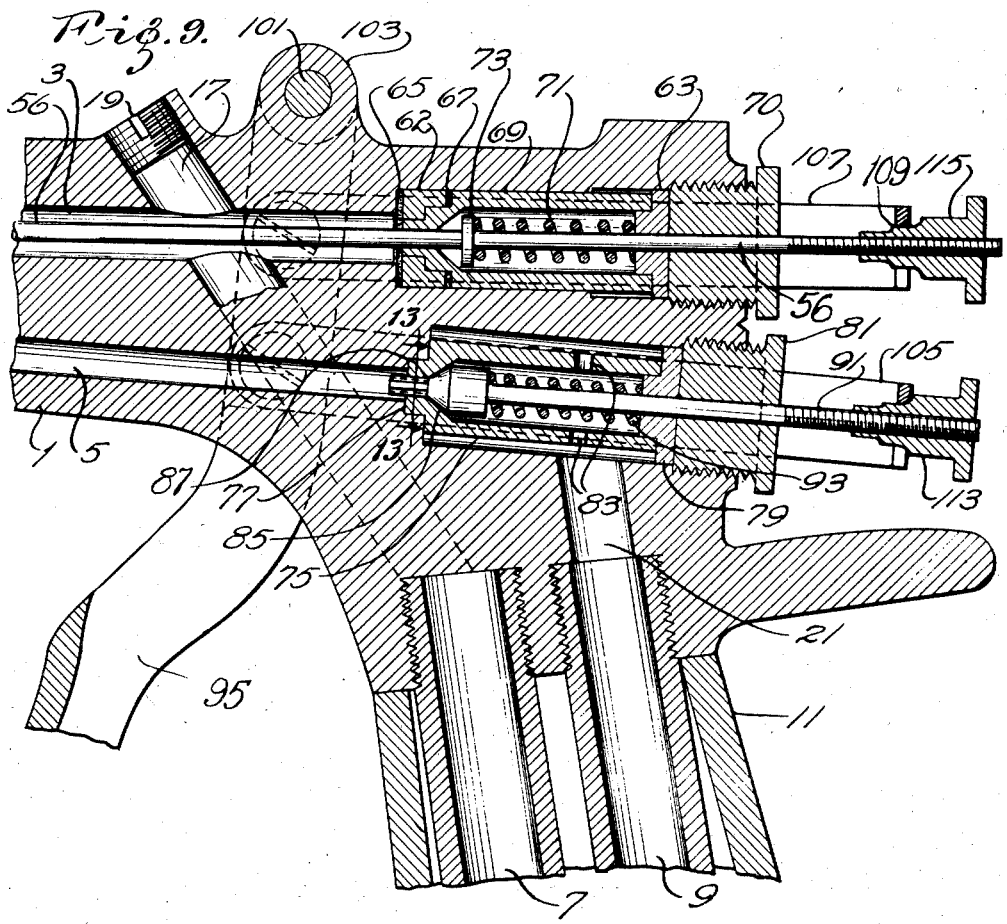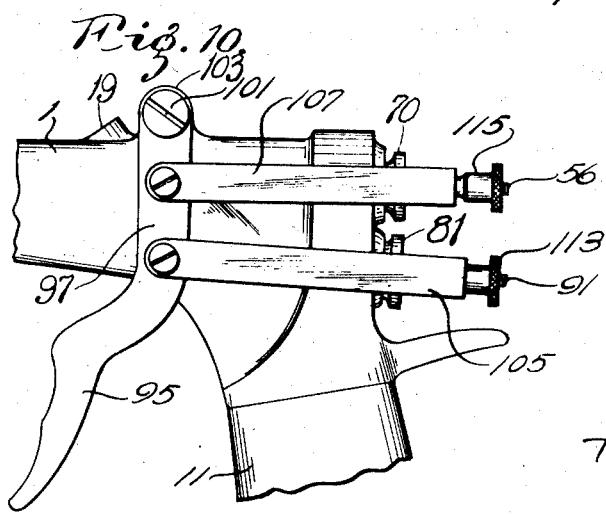

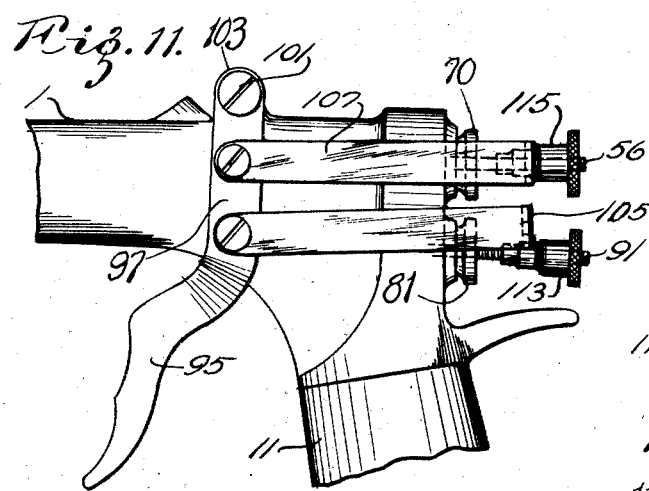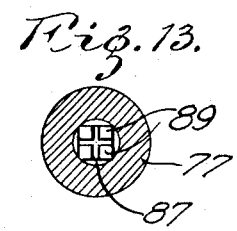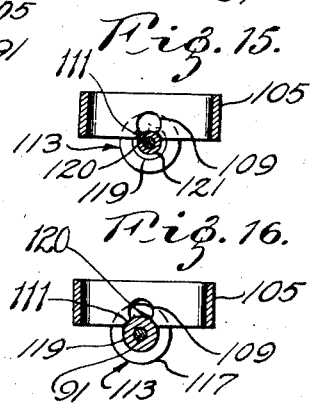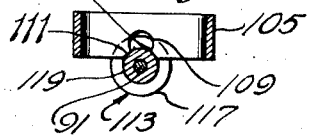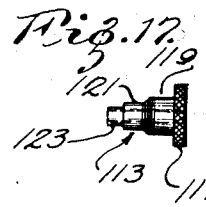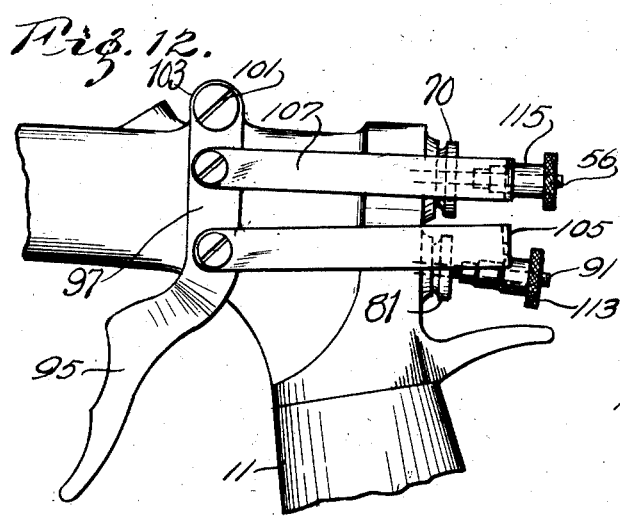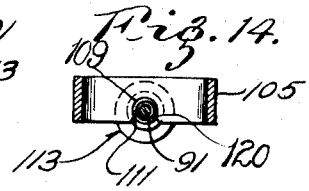

Patented Feb. 28, 1928.

1,661,150

UNITED STATES PATENT OFFICE.

THEODORE BIRKENMAIER, OF ST. LOUIS, MISSOURI, ASSIGNOR TO W. N. MATTHEWS CORPORATION, OF ST. LOUIS, MISSOURI, A CORPORATION OF MISSOURI.

COATING APPARATUS.

Application filed July 26, 1924. Serial No. 728,330.

This invention relates to coating apparatus and with regard to certain more specific features to spray guns for applying liquids as a coating to surfaces.

Among the several objects of the invention may be noted the provision of apparatus for spraying materials such as paints, varnishes and the like without clogging the spraying passages of the gun and without encrusting the outer ends of said passages when in operation, even when quick drying paints, varnishes and the like are used; the provision of simple means for adjusting the shape of the spray; means for easily and independently cutting in or out, either the liquid or air supply through the spray gun and the provision for the variable advent of the material with respect to that of the air when the gun comes into operation. Other objects will be in part obvious and in part pointed out hereinafter.

The invention accordingly comprises the features of construction, combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a side elevation of the spray gun assembled;

Fig. 2 is a top plan view of Fig. 1;

Fig. 3 is a fragmentary, median section of the tip of the spray gun, showing the paint nipple closed and the air nozzle in "round-target" position and also showing the method of fastening the tip;

Fig. 4 is a fragmentary, median section similar to Fig. 3 showing the paint nipple open and the air nozzle almost in "elliptical-target" position.

Fig. 5 shows a much enlarged tip section and liquid stream lines; illustrating the paint nipple open and the air nozzle in "round-target" position;

Fig. 6 is a section taken on line 6—6 of Fig. 5 showing the target shape;

Fig. 7 is a view similar to Fig. 5 but showing the air nozzle forward in "elliptical-target" position;

Fig. 8 is a section taken on line 8—8 of Fig. 7, showing the target shape;

Fig. 9 is a median section of the rearward portion of the gun taken on line 9—9 of Fig. 2 showing the valve mechanism details;

Fig. 10 is a fragmentary side elevation showing the trigger set for supplying air ahead of the paint;

Fig. 11 is a fragmentary side elevation showing the gun set for temporarily supplying paint only;

Fig. 12 is a fragmentary side elevation showing the gun set for permanently supplying paint only;

Fig. 13 is a section taken on the line 13—13 of Fig. 9;

Fig. 14 is a section taken on the line 14—14 of Fig. 1 showing a strap detail;

Fig. 15 is a view similar to Fig. 14 showing a strap resting on a portion of an adjusting nut;

Fig. 16 is a view similar to Fig. 14 showing a strap resting on another portion of an adjusting nut; and Fig. 17 is a side elevation of one adjusting nut.

Referring now more particularly to Figs. 1, 2 and 9 of the accompanying drawings, there is illustrated at 1 a body for the gun. This body is provided longitudinally with a paint or material passage 3 and a compressed air passage 5. Each passage is enlarged at its rearward opening to receive valve mechanisms to be described.

At the rear of the body 1, and screwed practically upwardly therein, are two supply pipes for air and spraying material under pressure. The material pipe 7 is located forwardly of the air pipe 9. These pipes are enclosed by the grip 11 which is held up against the body 1 by the nipples 13 and 15 on the supply pipes, which nipples also form means for fastening supply lines of preferably flexible material.

The material supply pipe 7 communicates with the material passage 3 by means of the bore 17 which is offset vertically to pass the air passage 5 untouched and is closed at its end by the plug 19. The air supply pipe 9 communicates with the air passage 5 by means of the bore 21. The described arrangement for the passages lends itself to easy manufacture.

The material and air passages 3 and 5 end forwardly in a nozzle cylinder 23 formed on the forward end of the gun (Figs. 3 and 4). The material passage 3 is enlarged and has threaded therein at its forward end the nipple 25, which nipple contains the passage 27 as a continuation of the paint passage 3. The details of this nipple will be described later.

Around the nozzle cylinder 23 is placed the snugly fitted nozzle casing 29, flanged outwardly at 31. This flange abuts the threaded ring 33, over which ring 33 is forced with a press fit, the flanged ring 35. The flange 37 on ring 35 cooperated with flange 31, permitting the latter to turn freely with respect to the rings 33 and 35 which are one piece to all intents and purposes. When the threaded piece 33 is screwed to threads 39 on the nozzle cylinder, rotation of the ring 33 in screwing it on the threads 39 causes a longitudinal movement of the nozzle casing 29 on the nozzle cylinder 23 without causing rotation in a lateral plane thereon. Rotation of the nozzle casing on the nozzle cylinder is, however, free to be accomplished by outside means.

The forward end of the nozzle cylinder or casing tapers inwardly forming the air chamber 41 which receives its air supply from the air passage 5. As is described later, some pressure will build up in the chamber 41 so that a seal is needed between the casing and cylinder. This is accomplished by cutting a groove at the end of the cylinder and placing a gasket 43 therein. Against this gasket is placed a forwardly dished metallic washer 44 having a central hole therein adapted to receive the nipple 25. A shoulder 26 on the nipple tends to flatten out the dish shape of the washer as the nipple is screwed home in the end of the paint passage, thereby forcing the edges of the washer to exert a local pressure on the gasket 43 and causing it to seal the joint between the casing and cylinder. The washer has a hole 46 cut therein to allow air to pass from the passage 5 to the chamber 41. The nozzle casing and nipple form what hereinafter will be known as the spray nozzle.

As before described, the forward end of the casing 29 tapers inwardly to a nozzle tip. At its forward tip it is formed solidly and has a bore 45 concentrically cut therein which bore decreases rearwardly at 47. In this solid forward tip are also bored, in a longitudinal plane through the center, the forwardly slanting holes or passages 49. These passages connect the chamber 41 with the bore 45, slanting forwardly therefrom and arranged radially.

The rearward smaller portion 47 of the bore 45 is made just slightly larger than the central portion 51 of the stem 53 on the nipple 25. The rearward portion of this stem 53 is made smaller than the central portion and the forward portion 55 is also made smaller than the central portion 51. The result is that, as the casing is in the rearward position on the cylinder shown in Figs. 3 and 5, a relatively free passage of air is permitted through the passage between the nipple stem 53 and the nozzle tip bore, and the air passages 49 by-pass air to impinge it on the central portion 51 of the nipple stem. This latter by-passage is relatively tortuous so that in this position most of the air leaves the gun centrally.

In the forward position of the casing shown in Figs. 4 and 7, the central passage between nipple and tip has become more tortuous and has its effective discharge area decreased, because of the small rearward passage 47 approaching the relatively large central portion 51 of the stem 53. This causes the pressure in chamber 41 to build up and force more air through the by-passages 49. This by-passing of air is further increased because the ends of the passages 49 are now free of the relatively large central portion 51 of the stem. The passages 49 in the present case force their contents against the smaller forward portion 55 of the stem and distort the previously annular section of air leaving the gun.

The complete action of paint and air leaving the gun will be explained shortly. Both paint and air supplies are regulated by proper valves and attending appurtenances, the details of which will be both described. The seat of the paint valve however is in the nipple stem 53, the paint valve stem 56 extending along the passage 3 and held centrally therein by the guide spider 57. Said spider permits the passage of liquid along the passage 3. The forward end of the valve stem is provided with a seating plug 59 ahead of which is situated the cleaning plug 61, which latter plug forces paint or other material out of the passage ahead of the seat when the valve is closed. The plug is slightly longer than the passage. This cleaner is of an advantage, as the passage referred to, when inoperative without a plug therein, has paint on its surfaces in the presence of air, which fact causes the paint to encrust and clog the passage.

The complete operation of the spraying portions of the gun follow: Assume relative positions of casing and cylinder as in Fig. 5. i. e., the casing back and the paint valve open. Air being forced into the chamber 41 finds a ready passage therefrom centrally, that is, between the nipple stem 53 and the nozzle or casing bore 45. A relatively small quantity of the air is by-passed through the passages 49 and again meets the main stream at the central enlarged portion 51 of the nipple stem 53. The total quantity of air then leaves the passage between the central portion 51 of the nipple stem 53 and the nozzle as an annular stream. This causes a low pressure area at the tip of the nipple stem, thereby helping to draw the already compressed paint or material therefrom, which material is broken up into fine globules upon being struck by the outrushing expanding annulus of air. The net result is a circular conical spray which will evenly distribute the material on a surface as illustrated in Fig. 6.

If a wider but more shallow spraying cone is desired the operator turns the knurled ring 35 until the casing is forwardly situated as in Fig. 7. This results in making the central passage between nipple stem and casing bore of a more tortuous nature and actually cuts its effective area thereby choking the passage and causing a back pressure to build up in the chamber 41, thus forcing more air through the now free ended passages 49. This by-passed air now does not mingle with the centrally emerging quantity before the emergence of said air as an annulus, but after said emergence. The result is a distortion of the annular shape of the section of the air to a section of more or less flattened nature. (Fig. 8). The outer end 55 of the nipple is provided in order that the impinging by-passed air currents will not force the outcoming section to take an irregular contour, such as shown in dotted lines of Fig. 8. By striking the outer end of the nipple stem as shown, the by-passed air streams do not cause too much local pressure at the center of the section but more evenly spread their effect sideways. The result is a smooth-curved desirable section resembling the ellipse. The outcoming air picks up and atomizes the paint as described previously.

If the elliptical section is required in a vertical or other position it is only necessary to turn the casing on the cylinder independently of the ring 35. This makes no change in the shape of the section as no lateral movement is obtained on the cylinder.

To this construction of the nozzle accrues the added advantage of compactness at the tip. Ordinarily when the ejecting ends of the by-passages are relatively distant from the central stream, the low pressure areas (such as at 57) become large in volume, and swirl-back eddies carry paint or material from the main stream to stick on the surrounding walls, drying there and later blowing off in slugs to mar a surface. The compact construction shown herewith eliminates such resulting detrimental large areas and action and a clean tip is always obtained. The sweeping action of the air on the end of the tip also prevents paint encrustation.

Referring now to the enlarged rearward portions of the passages 3 and 5, Fig. 9, I will describe the valve mechanisms. The seat of the material valve is, as described, in the nipple stem 53. The stem of the valve reaches back from here through the material passage and is enclosed rearwardly by the hollow sleeve 69, said sleeve being held between two collars 62 and 63. The forward collar 62 is enclosed by two gaskets, 65 and 67 front and rear which seal the passage 3 against rearward leakage into or around the sleeve 69. A plug 70 screwed into the body holds the sleeve and collars in place, its central bore acting as a guide for the valve stem. Within the chamber of the hollow sleeve 69 is mounted a spring 71 which abuts the collar 63 and reacts from there to a collar 73 formed on the valve stem to keep the valve seated. The valve is readily accessible for cleaning.

The air valve comprises a hollow sleeve 75 pressed home at a forwardly formed bored teat 77 which forms a leak-proof joint. Rearwardly, this sleeve is held in place by the collar 79 and the bored plug 81. The sleeve is provided with holes 83 which permit the passage of air into the sleeve. The forward end of the inside bore of this sleeve is formed to a seat and the tapered plug 85 rests therein when in closed position. Forwardly disposed of this plug 85 are four prongs 89 which are cut from a square section slightly rounded at the corners adapted to fit in the forward bore 87 of the sleeve teat 77 (Fig. 13). These prongs effect a simple means for guiding the valve stem, yet permitting a maximum amount of air to pass when the valve is open. Rearwardly of the plug 85 is the air valve stem 91 passing through the collar 79 and plug 81 to the outside. This valve is held in a seated position by means of the spring 93 abutting the rearward collar and pressing forward on the plug 85 within the sleeve 75. Air finds its way from the passage 21, through the holes 83 in sleeve 75 and thence to the air passage 5 through the valve seat when the valve is open. It may be noted that the valve stem may easily be removed for repair or regrinding.

The linkage for the valve operation is simple. It comprises a trigger 95 split upwardly, thereby forming two flat legs 97 and 99 which straddle the body of the gun ahead of the grip. These legs are pivoted to the body 1 by means of the lateral pin 101 in the lug 103.

From the rear of the gun two U-shaped straps 105 and 107 straddle it and are loosely pinned at each side to the aforesaid trigger legs. The lateral rearward portions of these straps are bored centrally at 109 (Fig. 15) and cut to meet the bore at 111 (Fig. 14). The lower opening 120 to the bore is narrower than the bore diameter. On the rearward ends of the valve stems are screwed the adjusting nuts 113 and 115. These nuts are formed (Fig. 17) with a relatively large knurled disc 117, a smooth barrel 119 large enough not to be admitted to the bore 109 as shown in Fig. 16 and a smaller barrel 121 which fits the bore 109 and can not pass out of it laterally because the bore 109 forms more than a semi-circle (Fig. 14). Ahead of the barrel 121 is formed still another smaller stem 123 adapted to be able to pass out of the bore 109 laterally. The transition from the barrel 121 to barrel 119 is gradual so that the straps may ride longitudinally from one to the other when required without catching.

It has been found desirable, when spraying material, to have the air turned on first. This eliminates any possibility of a slug of undivided paint or material being ejected from the gun.

To accomplish turning on the air first with one motion in turning on both valves, the adjusting nut for the air valve is screwed on its stem to such a position, with the central barrel 121 within the bore 109 of the strap 105, as to bring the forward end of barrel 119 against said strap when said strap and the trigger are in their normal forward inoperative position. In other words any motion rearward of the trigger will open the air valve immediately as barrel 119 abuts the strap and will not pass through bore 109.

The material valve nut, however, is screwed to its stem with the forward end of its barrel 119 some distance back of the strap 107. Its smaller barrel 121 enters the bore of the strap 107 as in the previous case. This manner of adjusting the material valve nut allows some lost motion between the strap and the valve stem.

Both straps being pivoted to the same trigger act simultaneously when said trigger is pulled rearwardly. The lower air valve strap immediately opens its valve because it is abutted against the barrel 119, while the material valve does not open for a predetermined time during the time the strap 107 rides free on its barrel 121. The material valve opens after a predetermined period in the same manner as the air valve while the air valve is yet forced open. The gun is then in full operation.

It is often desirable to throw a solid liquid stream without air atomization. To do this with the present gun it is only necessary to throw the trigger forward of its inoperative position whereupon the strap 105 can be lifted, the hole 109 now surrounding the small stem 123 which may pass out of it. Upon bringing the trigger back the strap will ride on the barrel 121. When the trigger is operated for painting, the strap 105 will ride along barrel 121 and pass up on the barrel 119, neither of the barrels fitting the entrance 120 to the hole 109. This is for a temporary action of the type described. If it be desired to make a more or less permanent "solid material" setting, the adjusting nut may be brought forward so that the strap rides on the large barrel 119 only (Fig. 16). This eliminates any possibility of the trigger being thrown forward with a resulting dropping into operative position of the strap 105 as can be done when the nut is not run forward. When the nut is not run forward the same action which took the strap off the nut will return it. This is not the case when the nut is screwed forward.

The straps and nuts may be set for other desired combinations in special circumstances. The air valve could be operated without the paint valve by making proper adjustments along the lines described.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a spraying device the combination of a spray nozzle comprising an air nozzle casing and a material nipple therein said nipple comprising a shoulder and a variable diametered stem thereon; a body for mounting said spray nozzle; a material valve in said stem comprising a seating plug, a seat for said plug and a cleaning plug ahead of the aforesaid plug, and an air valve in said body; adjustable relatively timed valve mechanisms for operating said valves, and means for adjusting the nozzle casing longitudinally.

2. In a spraying device the combination of a body provided with an air passage and a material passage both open forwardly; a variable diametered nipple in the forward opening of the material passage; a differentially bored nozzle casing surrounding said nipple on said body adapted to receive the nipple through said central bore, the casing being formed with passages for ejecting air on the nipple, means for forcing air out around the nipple, the casing being adapted to permit air flow around the nipple when air is ejected from said passages on the larger diametered portion of the nipple and adapted to reduce such flow when the air is ejected on the smaller diametered portion of the nipple.

3. In a spraying device the combination of a body formed with an air passage and a material passage both open forwardly; a variable diametered nipple formed at the forward opening of the material passage; a nozzle casing surrounding said nipple and joined to said body in a longitudinally adjustable manner the casing being provided with a variable bore therein adapted to receive the nipple through said central bore.

4. In a spraying device the combination of a body formed with an air passage therein and a material passage, both passages open forwardly, a variable diametered nipple at the forward opening of the material passage, a nozzle casing surrounding said nipple and adjustably disposed therewith, said nozzle casing being provided with a variable diametered bore, said bore surrounding said nipple and adapted by means of said adjustability and variableness of diameters to be choked to various degrees by said nipple.

5. In a spraying device the combination of a body formed with an air passage therein and a material passage, both passages open forwardly, a variable diametered nipple at the forward opening of the material passage, a nozzle casing surrounding said nipple and adjustably disposed therewith, said casing being slidably affixed to the body; said nozzle casing being provided with a variable diametered bore in the tip thereof surrounding said nipple, the casing forming a chamber between said body, casing and nipple, and being provided with passages leading through the said casing tip from the chamber to the central bore, means for adjusting the position of the plane of these passages and means in the aforesaid adjustment for varying their longitudinal position, said means choking or opening the central bore.

6. In a spraying device the combination of a body formed with an air passage therein and a material passage, both passages open forwardly, a variable diametered nipple at the forward opening of the material passage, a nozzle casing surrounding said nipple and adjustably disposed therewith having a variable diametered bore, said bore surrounding said nipple and adapted by means of said adjustability and variableness of diameters to be choked to various degrees by said nipple; the casing forming a chamber interposed between said casing nipple and body connected to said air passage; the casing tip having passages connecting said chamber with said variable central bore.

7. In a spraying device the combination of a body provided with an air passage therein and a material passage, both passages open forwardly, a variable diametered nipple at the forward opening of the material passage, said nipple comprising a hollow stem having a relatively large diametered central portion and smaller end portions, said stem being formed on a collar of said nipple; a nozzle casing surrounding said nipple and adjustably disposed therewith and provided with a variable diametered central bore adapted to receive loosely the said variable diametered nipple stem and being larger forwardly than rearwardly, said bore being adapted by variableness of diameters and adjustability to be choked to various degrees by said nipple, the casing forming a chamber interposed between said casing, body and nipple and being provided with passages from said chamber to the variable central bore, said passages opening on the relatively large central stem portion when the central bore is unchoked by the nipple, and opening on the relatively small forward portion when the central bore is more or less choked by the nipple.

8. In a spraying device the combination of a body provided with an air passage therein and a material passage; a longitudinally adjustable nozzle casing rotatably mounted on said body having a chamber in said nozzle casing; a variable diametered nipple in said chamber; the casing having a variable diametered bore adapted to receive said nipple adjustably in order to be more or less opened or choked by said nipple the casing being provided with passages from said chamber to said casing bore arranged with respect to the variable diametered nipple to be more or less choked when said bore is relatively open and to be free when said bore is more or less choked.

9. In a spraying device the combination of a body provided with an air passage therein and a material passage; a longitudinally adjustable nozzle casing variably mounted on said body having a chamber; a variable diametered nipple in said chamber; the casing having also a variable diametered bore adapted to receive said nipple adjustably in order to be more or less opened or choked by said nipple and having passages from said chamber to said casing bore arranged with respect to the variable diametered nipple so as to have the choking part of the same become operative on the passages when said bore is relatively open and to have said choking part become operative in the central bore when the passages have moved forward to become relatively more open.

10. In a spraying device the combination of a body provided with an air passage in the same and a material passage; an adjustable nozzle casing on said body receiving air from said air passage having a central variable diametered opening therein and by-passages thereto; a nipple screwed into said material passage and within said casing; a variable diametered stem on said nipple extending into said variable diametered casing opening and adapted to either choke said passages or said by-passages, the by-passages being adapted to distort an issuing stream from a circular contour when not in relatively choked position.

11. In a spraying device the combination of a body provided with an air passage in the same and a material passage; an adjustable nozzle casing on said body receiving air from said air passage having a central variable diametered opening therein and by-passages thereto; a nipple screwed into said material passage and within said casing; a variable diametered stem on said nipple extending into said variable diametered casing opening and adapted to either choke said passages or said by-passages, the by-passages being adapted to distort an issuing stream from a circular contour when not in relatively choked position; a material valve within said stem and a cleaning plug on said valve adapted to keep the nipple opening clean when inoperative.

12. In a spraying device the combination of a body provided with an air passage in the same and a material passage; an adjustable nozzle casing on said body receiving air from said air passage and having a central variable diametered opening therein and by-passages thereto; a nipple screwed into said material passage and within said casing; a variable diametered stem on said nipple extending into said variable diametered casing opening and adapted to either choke said passages or said by-passages, the by passages being adapted to distort an issuing stream from a circular contour when not in relatively choked position; a material valve within said stem and a cleaning plug on said valve adapted to keep the nipple opening clean when inoperative; operating means in the rear of the body for said valve; and an air valve in the rear of the body in the air passage.

13. In a spraying device the combination of a body provided with an air passage in the same and a material passage; an adjustable nozzle casing on said body receiving air from said air passage and having a central variable diametered opening in said casing and by passages thereto; a nipple screwed into said material passage and within said casing; a variable diametered stem on said nipple extending into said variable diametered casing opening and adapted to either choke said passages or said by-passages, the by passages being adapted to distort an issuing stream from a circular contour when not in relatively choked position; a material valve within said stem and a cleaning plug on said valve adaptable to keeping the nipple opening clean when inoperative; operating means in the rear of the body for said valve; an air valve in the rear of the body in the air passage; and a trigger for operating said valves.

14. In a spraying device the combination of a body provided with an air passage in the same and a material passage; an adjustable nozzle casing on said body receiving air from said air passage having a central variable diametered opening therein and by-passages thereto; a nipple screwed into said material passage and within said casing; a variable diametered stem on said nipple extending into said variable diametered casing opening and adapted to either choke said passages or said by-passages alternately, the by-passages being adapted to distort an issuing stream from a circular contour when said by-passages are relatively unchoked and said central opening is relatively choked, and not to substantially distort said stream when the by-passages are relatively choked and the said central opening relatively unchoked.

In testimony whereof, I have signed my name to this specification this 24th day of July, 1924.

THEODORE BIRKENMAIER.